(12) United States Patent
Przybylski

(10) Patent No.: US 11,002,577 B2
(45) Date of Patent: May 11, 2021

(54) FIBER OPTIC FLOW SENSOR

(71) Applicant: Johnson Controls Technology Company, Auburn Hills, MI (US)

(72) Inventor: Andrew J. Przybylski, Franksville, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 47 days.

(21) Appl. No.: 16/117,404

(22) Filed: Aug. 30, 2018

(65) Prior Publication Data

US 2019/0072419 A1 Mar. 7, 2019

Related U.S. Application Data

(60) Provisional application No. 62/553,230, filed on Sep. 1, 2017.

(51) Int. Cl.
| | | |
|---|---|---|
| *G02B 6/42* | (2006.01) | |
| *G01F 1/28* | (2006.01) | |
| *F24F 11/89* | (2018.01) | |
| *F24F 110/30* | (2018.01) | |

(52) U.S. Cl.
CPC ............... *G01F 1/28* (2013.01); *F24F 11/89* (2018.01); *G02B 6/4295* (2013.01); *F24F 2110/30* (2018.01)

(58) Field of Classification Search
CPC .................................................. G02B 6/4295
See application file for complete search history.

(56) References Cited

U.S. PATENT DOCUMENTS

| | | |
|---|---|---|
| 7,004,038 B2 | 2/2006 | Tsai |
| 9,746,199 B1 | 8/2017 | Drees et al. |
| 2005/0145039 A1* | 7/2005 | Tsai .................... G01F 1/28 73/861 |
| 2015/0163945 A1* | 6/2015 | Barton .................. G08B 5/36 361/809 |

OTHER PUBLICATIONS

Ganguly et al., "Fluid Flow Measurement Using Bending Loss of Optical Fiber," Proceedings of National Conference NATCONIC 2011, pp. 8-10. Jan. 6-7, 2011.
Hu et al., "A Simple Fiber-Optic Flowmeter Based on Bending Loss," IEEE Sensors Journal, vol. 9, No. 12, pp. 1952-1955. Dec. 2009.

* cited by examiner

*Primary Examiner* — Chris H Chu
(74) *Attorney, Agent, or Firm* — Foley & Lardner LLP

(57) ABSTRACT

A fiber optic flow sensor includes a fiber optic cable, a light emitter, an optical power meter, and a processing circuit. The fiber optic cable allows light to enter a first end of the fiber optic cable, reflect off a second end of the fiber optic cable and exit the fiber optic cable through the first end. The fiber optic cable is at least partially exposed to fluid flow at the second end. The light emitter emits light at an input power into the first end of the fiber optic cable. The optical power meter measures an output power of the light exiting the fiber optic cable at the first end. The processing circuit calculates a flow rate of the flow of fluid based on the input power of light entering the fiber optic cable and the output power of light exiting the first end of the fiber optic cable.

20 Claims, 11 Drawing Sheets

FIBER OPTIC FLOW SENSOR

CROSS-REFERENCE TO RELATED PATENT APPLICATION

This application claims the benefit of and priority to U.S. Provisional Patent Application No. 62/553,230 filed Sep. 1, 2017, the entire disclosure of which is incorporated by reference herein.

BACKGROUND

The present disclosure relates generally to building management systems and more particularly to building management systems that use measurements from flow rate sensors to operate building equipment.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Some BMSs require reliable and extensive flow knowledge to provide optimal control of building equipment. Many buildings do not have the necessary flow sensors required to obtain flow measurements at all of the desired locations. Flow sensors can be expensive upgrades as they often require placing the sensor as part of the pipe itself. It can be labor-intensive and costly to add flow sensors to a BMS.

SUMMARY

One implementation of the present disclosure is a fiber optic flow sensor. The fiber optic flow sensor includes a fiber optic cable, a light emitter, an optical power meter, and a processing circuit. The fiber optic cable is configured to allow light to enter a first end of the fiber optic cable, reflect off a second end of the fiber optic cable, and exit the fiber optic cable through the first end. The fiber optic cable is at least partially exposed to a flow of fluid at the second end. The light emitter is configured to emit light at an input power into the first end of the fiber optic cable. The optical power meter is configured to measure an output power of the light exiting the fiber optic cable at the first end after the light has reflected off the second end of the fiber optic cable and returned to the first end of the fiber optic cable. The processing circuit is configured to calculate a flow rate of the fluid based on the input power of the light entering the fiber optic cable and the output power of the light exiting the first end of the fiber optic cable.

In some embodiments, the processing circuit includes a power loss calculator, a bend estimator and a flow estimator.

In some embodiments, the power loss calculator is configured to calculate a power loss of the light through the fiber optic cable by comparing the input power of the light entering the fiber optic cable to the output power of the light exiting the fiber optic cable at the first end.

In some embodiments, the power loss calculator is configured to calculate the power loss using a logarithmic based difference between the input power and the output power.

In some embodiments, the bend estimator is configured to calculate a bend radius of the fiber optic cable based on the power loss calculated by the power loss calculator.

In some embodiments, the bend estimator is configured to calculate the bend radius using a power loss model that relates the power loss of the light through the fiber optic cable to the bend radius of the fiber optic cable. The power loss model is at least one of an equation, a curve, a graph, a lookup table, or an empirical set of data.

In some embodiments, the flow estimator is configured to calculate the flow rate of the fluid based on the bend radius calculated by the bend estimator.

In some embodiments, the flow estimator is configured to calculate the flow rate of the fluid using a flow rate model that relates the bend radius of the fiber optic cable to the flow rate of the fluid. The flow rate model is at least one of an equation, a curve, a graph, a lookup table, or an empirical set of data.

In some embodiments, the fiber optic flow sensor includes a communications interface. The communications interface is configured to receive the flow rate of the fluid from the processing circuit and to transmit the flow rate to a HVAC component for use in controlling an operation of the HVAC component based on the flow rate of the fluid.

In some embodiments, the HVAC component is at least one of a building management system, a central plant controller, a smart actuator, a smart chiller, or a smart thermostat.

Another implementation of the present disclosure is a method for determining a flow rate of fluid through a fluid conduit. The method includes inserting a fiber optic cable having a first end and a second end at least partially into the fluid conduit such that the second end of the fiber optic cable is exposed to fluid flow through the conduit, emitting light at an input power into the first end of the fiber optic cable, such that the light enters the first end of the fiber optic cable at the input power, reflects off the second end of the fiber optic cable, and exits the first end of the fiber optic cable at an output power, measuring the output power of the light exiting the first end of the fiber optic cable after the light has reflected off the second end of the fiber optic cable and returned to the first end of the fiber optic cable, and calculating the flow rate of the fluid through the conduit based on the input power of the light entering the fiber optic cable and the output power of the light exiting the fiber optic cable.

In some embodiments, the method further includes comparing the input power of the light entering the fiber optic cable to the output power of the light exiting the fiber optic cable at the first end.

In some embodiments, the method further includes calculating a logarithmic based difference of the input power of light entering the fiber optic cable and the output power of light exiting the fiber optic cable at the first end.

In some embodiments, the method further includes calculating the bend radius of the fiber optic cable based on the power loss of the light.

In some embodiments, the method further includes using a power loss model to calculate the bend radius of the fiber optic cable, wherein the power loss model comprises at least one of an equation, a curve, a graph, a lookup table, or an empirical set of data. The equation, curve, graph, lookup table, and empirical set of data relate the power loss of the light to the bend radius of the fiber optic cable.

In some embodiments, the method further includes calculating the flow rate of the fluid based on the bend radius.

In some embodiments, the method further includes using a flow rate model to calculate the flow rate of the fluid. The flow rate model is at least one of an equation, a curve, a graph, a lookup table, or an empirical set of data. The equation, curve, graph, lookup table, and empirical set of data relate the bend radius of the fiber optic cable to the flow rate of the fluid through the fluid conduit.

In some embodiments, the method further includes controlling an HVAC component based on the flow rate of the fluid.

In some embodiments, the method further includes controlling at least one of a building management system, a central plant controller, a smart actuator, a smart chiller, or a smart thermostat.

DETAILED DESCRIPTION

Overview

Referring generally to the FIGURES, a fiber optic flow sensor and components thereof are shown according to some embodiments. The fiber optic flow sensor can be configured to determine the flow rate of a fluid through a pipe using a fiber optic based sensing technique. A fiber optic cable can be inserted through a small hole in the side of the pipe. The fiber optic flow sensor can be configured to emit light into an end of the fiber optic cable attached to the sensor. The light emitted into the fiber optic cable may have a known input power $P_i$. The input light may travel through the fiber optic cable, reflect off a reflective end of the fiber optic cable, and travel back through the fiber optic cable, returning to the fiber optic flow sensor. The fiber optic flow sensor can be configured to measure the output power $P_o$ of the output light exiting the end of the fiber optic cable. The fiber optic flow sensor can use the input power $P_i$ and the output power $P_o$ to calculate an optical power loss (dB).

Fluid flow through the pipe may cause the fiber optic cable to bend. As the flow rate of the fluid through the pipe increases, the bend radius r of the fiber optic cable may decrease. The amount of power transmitted through the fiber optic cable may be proportional to the angle of incidence of the light reflecting off the side walls within the fiber optic cable. Decreasing the bend radius r may decrease the angle of incidence, which causes less power to be transmitted through the fiber optic cable. In other words, as the bend radius r decreases, the optical power loss may increase. The fiber optic flow sensor can use a power loss model (e.g., a known relationship between bend radius r and optical power loss) to estimate the bend radius r as a function of optical power loss.

Similarly, the fiber optic flow sensor can use a flow rate model (e.g., a known relationship between flow rate and bend radius r) to estimate the flow rate of the fluid through the pipe as a function of the bend radius r. In some embodiments, the flow rate model is a simply turbulent flow model that accounts for zero flow at the edge of the pipe. The flow rate determined by the fiber optic flow sensor can be sent via a wired or wireless communications interface to a building management system, a central plant controller, a smart actuator, a smart chiller, a smart thermostat, or other external systems or devices that make use of the flow rate. These and other features of the fiber optic flow sensor are described in greater detail below.

Building HVAC Systems and Building Management Systems

Figure 1:
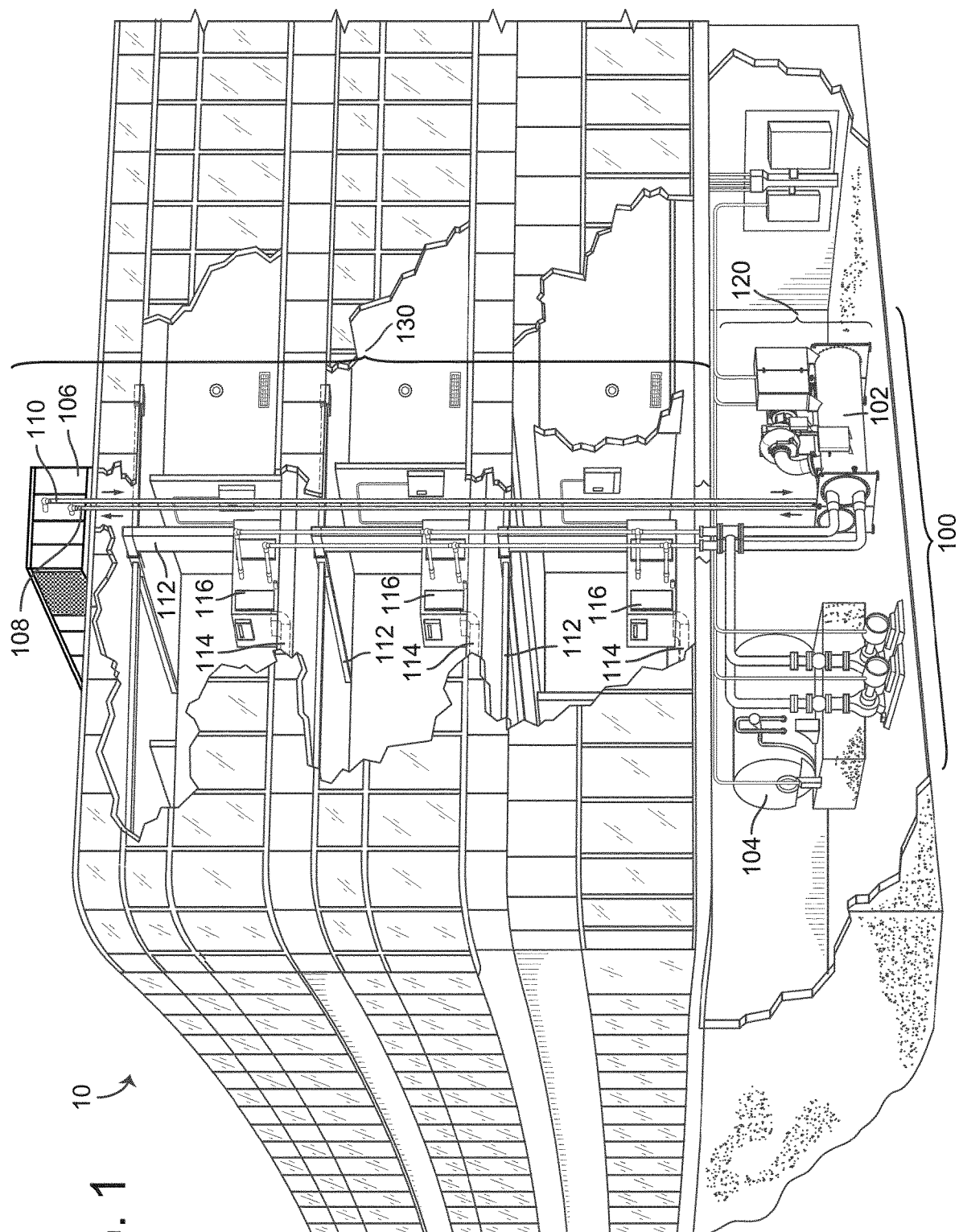
FIG. 1 is a drawing of a building equipped with a heating, ventilation, or air conditioning (HVAC) system, according to some embodiments.
Figure 2:
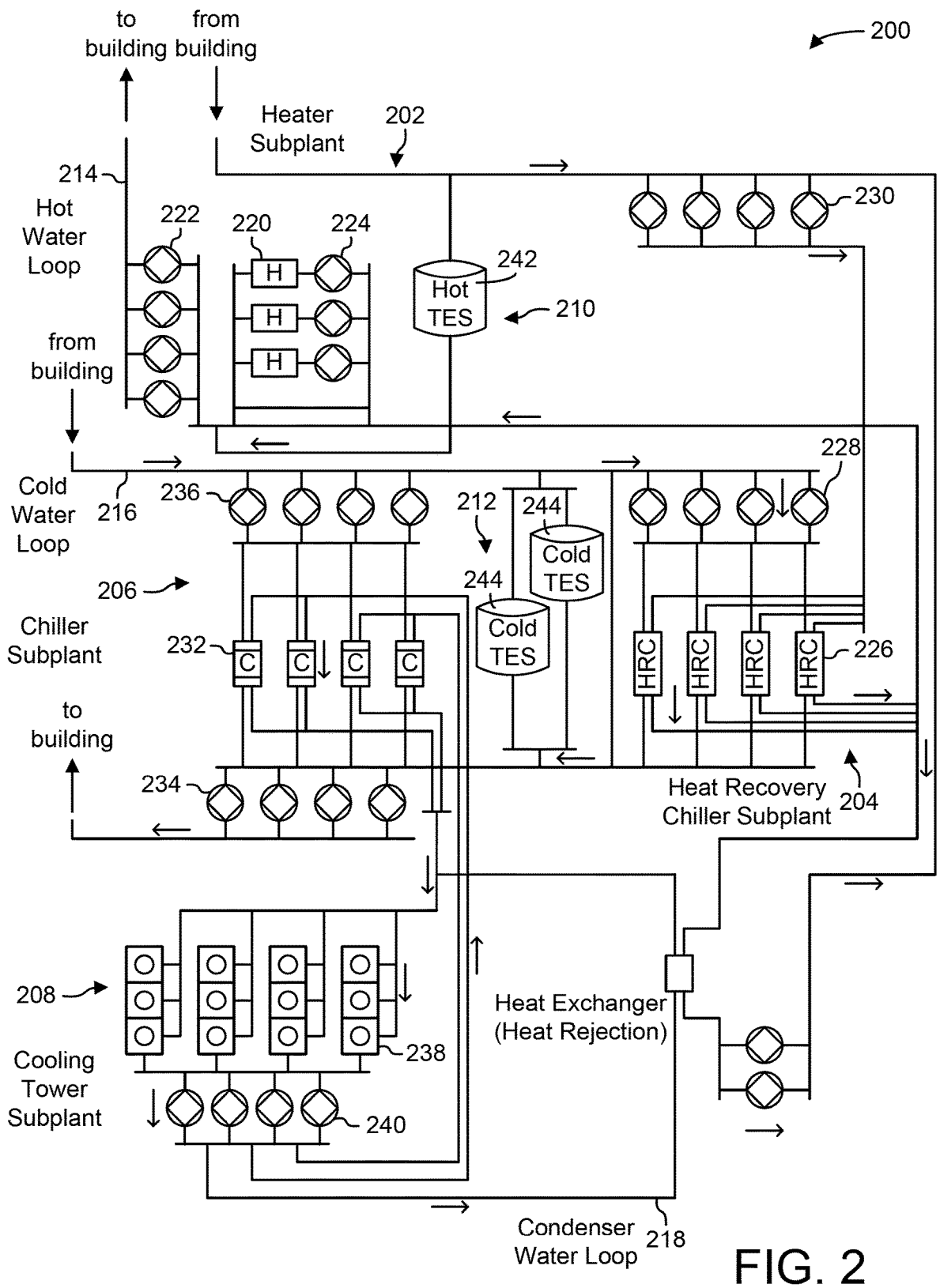
FIG. 2 is a drawing of a waterside system which can be used in combination with the HVAC system of FIG. 1, according to some embodiments.
Figure 3:
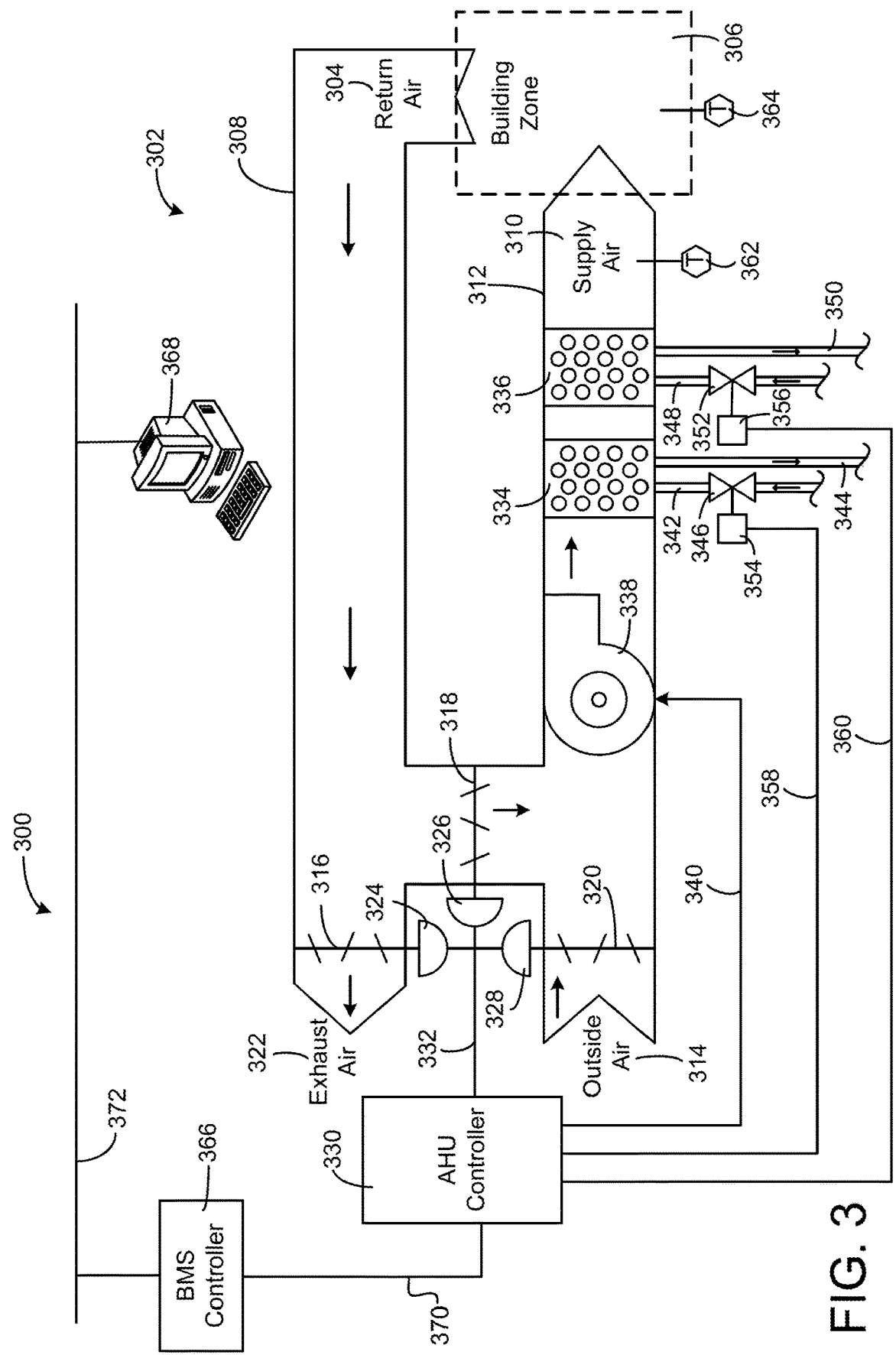
FIG. 3 is a drawing of an airside system which can be used in combination with the HVAC system of FIG. 1, according to some embodiments.
Figure 4:
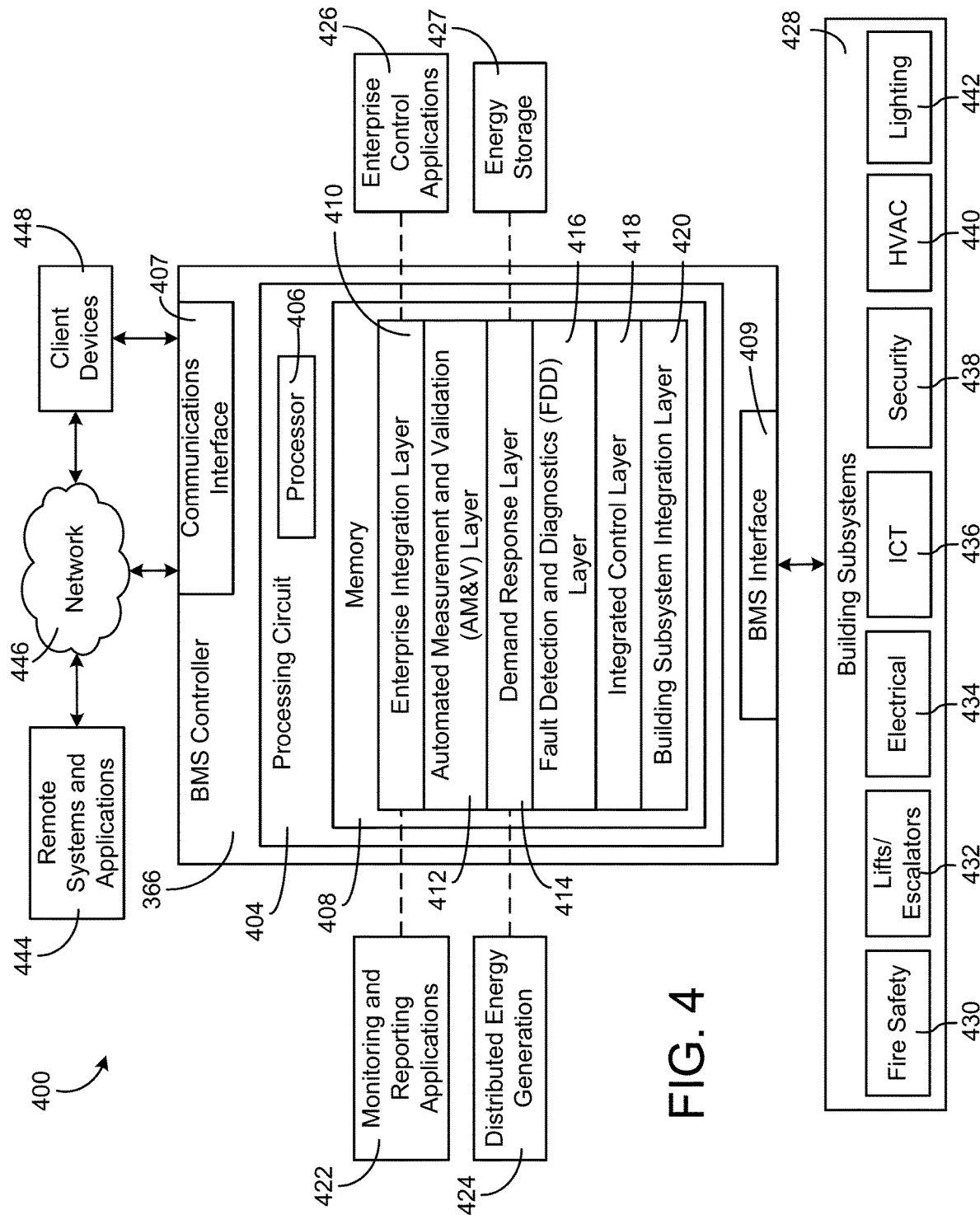
FIG. 4 is a block diagram of a building management system which can be used to monitor and control the building and HVAC system of FIG. 1, according to some embodiments.
Figure 5:
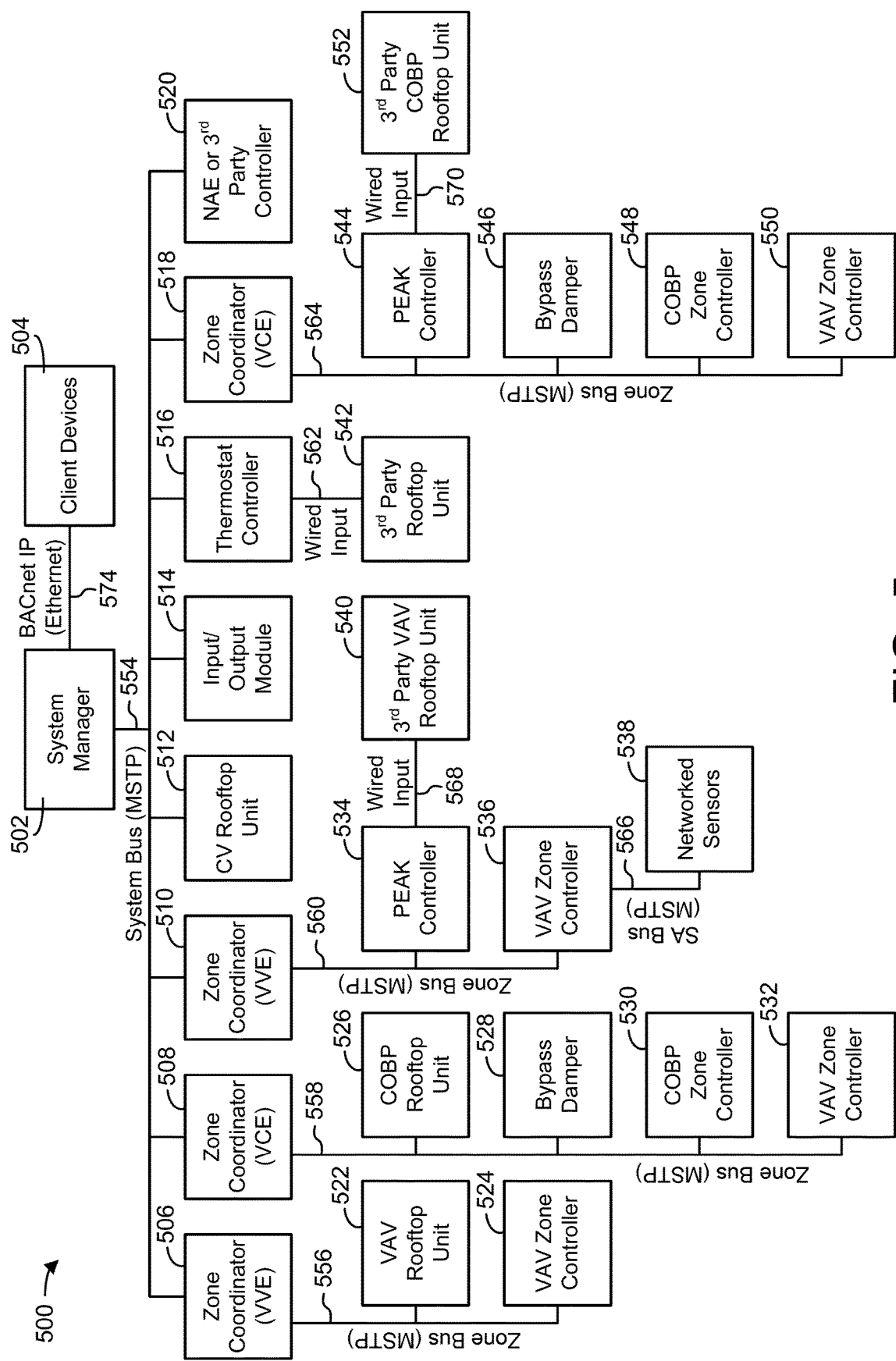
FIG. 5 is a block diagram of another building management system which can be used to monitor and control the building and HVAC system of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/ output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Fiber Optic Flow Sensor

Figure 6:
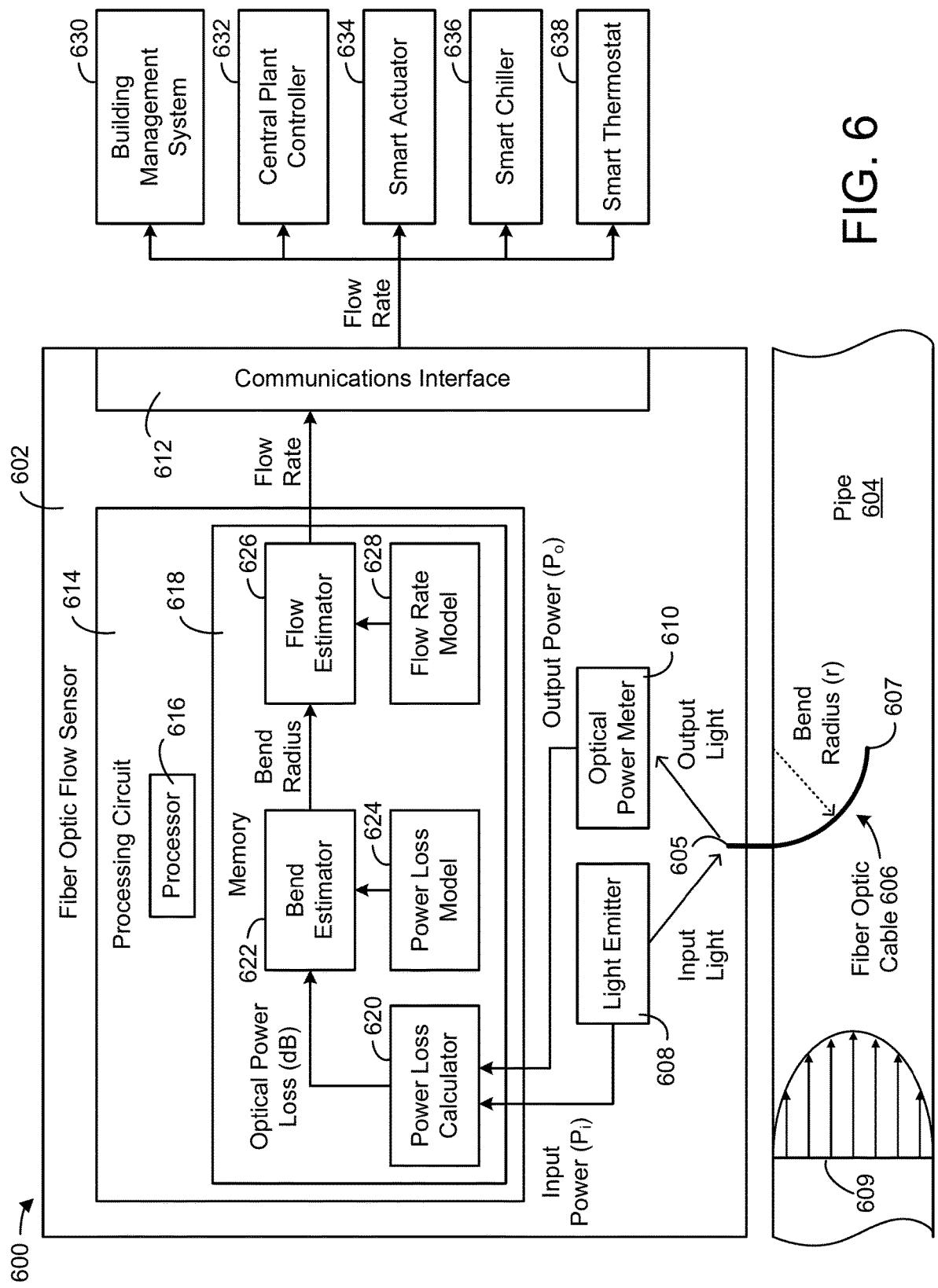
FIG. 6 is a block diagram of a fiber optic sensing system including a fiber optic flow sensor, according to some embodiments.

Referring now to FIG. 6, a block diagram of a fiber optic sensing system 600 is shown, according to some embodiments. System 600 is shown to include a fiber optic flow sensor 602 and a pipe 604. Fiber optic flow sensor 602 can be configured to determine the flow rate of a fluid through pipe 604 using a fiber optic based sensing technique. In brief overview, a fiber optic cable 606 can be inserted through a small hole in the side of pipe 604. Sensor 602 can be configured to emit light into an end 605 of fiber optic cable 606 attached to sensor 602. The light emitted into end 605 may have a known input power $P_i$. The input light may travel through fiber optic cable 606, reflect off a reflective end 607 of fiber optic cable 606, and travel back through fiber optic cable 606, returning to sensor 602. Sensor 602 can be configured to measure the output power $P_o$ of the output light exiting end 605. Sensor 602 can use the input power $P_i$ and the output power $P_o$ to calculate an optical power loss (dB).

Fiber optic cable 606 may be installed by inserting fiber optic cable 606 through a small hole in the side of pipe 604 such that a free end of fiber optic cable 606 is exposed to fluid flow through pipe 604. Fiber optic cable 606 may be sealed using rubber, epoxy, caulk, etc., or any other insertable seal/sealant which prevents fluid from leaking out of pipe 604. In some embodiments, fiber optic flow sensor 602 may be prevented from being pulled into pipe 604 by the seal/sealant. Advantageously, inserting fiber optic cable 606 through only one hole in pipe 604 and allowing the free end to reside within pipe 604 allows for an easy and fast installation of fiber optic cable 606. Since fiber optic cable 606 can be inserted through only one hole in pipe 604 and does not also extend through an opposing hole in pipe 604, the number of holes which must be drilled to install fiber optic cable 606 is minimal. This reduces the need to drill and seal multiple holes which may be harmful to the strength, integrity and seal of pipe 604. Additional holes may cause pipe 604 to leak which may affect the pressure of the fluid passing through pipe 604 and introduce additional turbulence to the fluid, or may introduce undesirable air bubbles into the fluid. Additionally, inserting fiber optic cable 606 through a single hole in pipe 604 eliminates the need to align fiber optic cable 606 to also fit through an opposing hole in pipe 604. This also makes fiber optic cable 606 faster and easier to install relative to more complex multi-hole configurations.

When installed in pipe 604, fiber optic cable 606 may have a fixed end that is fixed (e.g., securely attached) to the wall of pipe 604 and a free end exposed to fluid flow within pipe 604. The free end may move relative to the fixed end, causing fiber optic cable 606 to bend as a result of fluid flow within pipe 604. In other words, fiber optic cable 606 may be cantilevered (i.e., having a fixed end and a free end) when installed in pipe 604. The fixed end of fiber optic cable 606 which passes through the wall of the pipe 604 may act as the fixed connection of the cantilever, whereas the free end of fiber optic cable 606 which is in the fluid flow path acts as the free end of the cantilever.

Fiber optic cable 606 may be inserted into pipe 604 in an unbent state (i.e., linear, having an initial bend radius substantially equal to infinity). The orientation of fiber optic cable 606 in the unbent state may be substantially perpendicular to the direction of fluid flow through pipe 604. For example, a centerline of fiber optic cable 606 (a line passing normally (i.e., perpendicularly) through the cross-section of fiber optic cable 606 and along the length of fiber optic cable 606) in the unbent state may be substantially perpendicular to the longitudinal direction of pipe 604 along which fluid flows through pipe 604. Advantageously, installing fiber optic cable 606 in the unbent state allows for easy and fast installation. To install fiber optic cable 606 in pipe 604, a technician simply drills a hole in pipe 604, inserts the appropriate length of fiber optic cable 606 through the hole and fixedly seals fiber optic cable 606 in place. The technician does not need to ensure that fiber optic cable 606 has an appropriate initial bend radius. Additionally, the technician does not need to rotate fiber optic cable 606 within the hole to ensure that fiber optic cable 606 is oriented properly relative to the direction of fluid flow. For example, if fiber optic cable 606 were inserted in a bent state, it would be necessary to properly orient the direction of the bend relative to the direction of fluid flow within pipe 604. All of these difficulties are eliminated by inserting fiber optic cable 606 in an unbent state.

Fluid flow through pipe 604 may cause fiber optic cable 606 to bend. As the flow rate of the fluid through pipe 604 increases, the bend radius r of fiber optic cable 606 may decrease. The amount of power transmitted through fiber optic cable 606 may be proportional to the angle of incidence of the light reflecting off the side walls within fiber optic cable 606. Decreasing the bend radius r may decrease the angle of incidence, which causes less power to be transmitted through fiber optic cable 606. In other words, as the bend radius r decreases, the optical power loss may increase. Fiber optic flow sensor 602 can use a power loss model 624 (e.g., a known relationship between bend radius r and optical power loss) to estimate the bend radius r as a function of optical power loss.

Fiber optic cable 606 may bend elastically as a result of fluid flow within pipe 604 and may return elastically to the unbent state when the fluid flow stops. In other words, fiber optic cable 606 may have a modulus of elasticity (i.e., Young's Modulus) that allows fiber optic cable 606 to bend or deflect (i.e., the free end of fiber optic cable 606 changes in spatial location relative to the fixed end of fiber optic cable 606) as the flow rate of the fluid increases and return to a position such that the centerline of fiber optic cable 606 is generally perpendicular to the direction of flow of the fluid through pipe 604 when the flow rate of the fluid through pipe 604 stops or falls below a certain value.

Fiber optic flow sensor 602 can use a flow rate model 628 (e.g., a known relationship between flow rate and bend radius r) to estimate the flow rate of the fluid through pipe 604 as a function of the bend radius r. In some embodiments, flow rate model 628 is a simply turbulent flow model that accounts for zero flow at the edge of pipe 604. The flow rate determined by sensor 602 can be sent via a wired or wireless communications interface 612 to a building management system 630, a central plant controller 632, a smart actuator 634, a smart chiller 636, a smart thermostat 638, or other external systems or devices that make use of the flow rate. These and other features of fiber optic flow sensor 602 are described in greater detail below.

Still referring to FIG. 6, fiber optic flow sensor 602 is shown to include a light emitter 608 and an optical power meter 610. Light emitter 608 can be configured to emit input light into end 605 of fiber optic cable 606. In some embodiments, the input light is laser light. The input light may have a wavelength that falls within the visible light spectrum (i.e., from 400 nm to 700 nm) or the near infrared light spectrum (e.g., from 700 nm to 1700 nm). The input light may have a known optical power $P_i$.

In some embodiments, the input power $P_i$ is given in units of Watts (W), milliwatts (mW), or other units of power. In other embodiments, the input power $P_i$ is given in units of decibel-milliwatts (dBm). Sensor 602 can be configured to convert between units of power and units of dBm using the following equation:

$$P_{dBm} = 10\log_{10}\frac{P_{mW}}{1\text{ mW}}$$

where $P_{dBm}$ is the value of the input power $P_i$ in units of dBm and $P_{mW}$ is the value of the input power $P_i$ in units of mW. Light emitter 608 can send the value of the input power $P_i$ to power loss calculator 620 for use in calculating the optical power loss.

The input light may enter fiber optic cable 606 through end 605 and travel through fiber optic cable 606 toward end 607. Fiber optic cable 606 can be any type of optical fiber configured to transmit light. In various embodiments, fiber optic cable 606 may be a single-mode (SM) fiber or a multi-mode (MM) fiber. In some embodiments, fiber optic cable 606 is made of silica-based glass and includes a central core surrounded by cladding. The central core may have a refractive index of N1, whereas the cladding may have a lower refractive index of N2. When light enters fiber optic cable 606, the cladding may confine the light to the central core. The light may travel down the length of fiber optic cable 606 by internal reflection between the boundaries of the central core and the cladding. End 607 of fiber optic cable 606 may be reflective such that the light reflects off end 607 and travels back through fiber optic cable 606 toward end 605 and sensor 602, exiting fiber optic cable 606 as output light.

In some embodiments, fiber optic cable 606 is a flexible optical fiber that is substantially linear (i.e., having an infinite bend radius r) when no external forces are applied to fiber optic cable 606. Applying a radial force to fiber optic cable 606 may cause fiber optic cable 606 to bend, thereby decreasing the bend radius r. In some embodiments, fiber optic cable 606 includes a flexible portion and a rigid portion. The rigid portion may not bend when exposed to fluid flow, whereas the flexible portion may bend when exposed to fluid flow. The rigid portion may include end 605 and a portion of fiber optic cable 606 extending from end 605. The flexible portion may include end 607 and a portion of fiber optic cable 606 extending from end 607.

Optical power meter 610 can be configured to measure the optical power $P_o$ of the output light exiting end 605 of fiber optic cable 606. In some embodiments, optical power meter 610 includes a photodiode or other type of optical sensor configured to measure the output power $P_o$. For example, optical power meter 610 can include a semiconductor sensor (e.g., silicon (Si), germanium (Ge), indium gallium arsenide (InGaAs)), a radiometer, a photometer, a laser power meter (e.g., a photodiode sensor or thermopile laser sensor), a light meter, or lux meter. Optical power meter 610 can be configured to measure the output power $P_o$ at a particular wavelength of the input light emitted by light emitter 608.

In some embodiments, the output power $P_o$ is measured in units of Watts (W), milliwatts (mW), or other units of power. In other embodiments, the output power $P_o$ is measured in units of decibel-milliwatts (dBm). Sensor 602 can be configured to convert between units of power and units of dBm using the following equation:

$$P_{dBm} = 10\log_{10}\frac{P_{mW}}{1\text{ mW}}$$

where $P_{dBm}$ is the value of the output power $P_o$ in units of dBm and $P_{mW}$ is the value of the output power $P_o$ in units of mW. Optical power meter 610 can send the value of the output power $P_o$ to power loss calculator 620 for use in calculating the optical power loss.

Still referring to FIG. 6, fiber optic flow sensor 602 is shown to include a communications interface 612 and a processing circuit 614. Communications interface 612 can include wired or wireless communications interfaces (e.g., jacks, antennas, transmitters, receivers, transceivers, wire terminals, etc.) for conducting data communications with external systems or devices (e.g., building management system 630, central plant controller 632, smart actuator 634, smart chiller 636, smart thermostat 638, a user device, etc.). Data communications via communications interface 612 can be direct (e.g., local wired or wireless communications) or via a communications network (e.g., a LAN, a WAN, the Internet, a cellular network, etc.). For example, communications interface 612 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Fiber optic flow sensor 602 can use communications interface 612 to send the measured flow rates to building management system 630, central plant controller 632, smart actuator 634, smart chiller 636, smart thermostat 638, a user device, or other external systems or devices. In some embodiments, fiber optic flow sensor 602 also uses communications interface 612 to receive information. For example, fiber optic flow sensor 602 can receive a power loss model 624 and/or a flow rate model 628 via communications interface 612. The power loss model 624 and flow rate model 628 can be stored locally within sensor 602 and used to translate an optical power loss measurement to a flow rate measurement (described in greater detail below).

Processing circuit 614 is shown to include a processor 616 and memory 618. Processing circuit 614 can be communicably connected to communications interface 612 such that processing circuit 614 and the various components thereof can send and receive data via communications interface 612. Processor 616 can be implemented as a general purpose processor, an application specific integrated circuit (ASIC), one or more field programmable gate arrays (FPGAs), a group of processing components, or other suitable electronic processing components.

Memory 618 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 618 can be or include volatile memory or non-volatile memory. Memory 618 can include database components, object code components, script components, or any other type of information structure for supporting the various activities and information structures described in the present application. In some embodiments, memory 618 is communicably connected to processor 616 via processing circuit 614 and includes computer code for executing (e.g., by processing circuit 614 and/or processor 616) one or more processes described herein.

Still referring to FIG. 6, fiber optic flow sensor 602 is shown to include a power loss calculator 620, a bend estimator 622, and a flow estimator 626. Power loss calculator 620 can be configured to calculate an optical power loss through fiber optic cable 606 based on the known input power $P_i$ of the input light and the measured output power $P_o$ of the output light. In some embodiments, power loss calculator 620 determines the optical power loss in units of decibels (dB). A decibel is a unit used to express relative differences in signal strength and can be expressed as the base 10 logarithm of the ratio of the two signals.

In some embodiments, power loss calculator 620 receives the input power $P_i$ and the output power $P_o$ in units of power (e.g., mW) and uses the following equation to calculate the optical power loss:

$$dB = 10\log_{10}\left(\frac{P_{i,mW}}{P_{o,mW}}\right)$$

where $\log_{10}$ is the base 10 logarithm, $P_{i,mW}$ is the input power in units of power (e.g., mW), $P_{o,mW}$ is the output power in units of power (e.g., mW), and dB is the optical power loss in units of decibels.

In other embodiments, power loss calculator 620 receives the input power $P_i$ and the output power $P_o$ in units of decibel-milliwatts (dBm) and uses the following equation to calculate the optical power loss:

$$dB = P_{i,dBm} - P_{o,dBm}$$

where $P_{i,dBm}$ is the input power in units of dBm, $P_{o,dBm}$ is the output power in units of dBm, and dB is the optical power loss in units of decibels. The variables $P_{i,dBm}$ and $P_{o,dBm}$ can be defined as follows:

$$P_{i,dBm} = 10\log_{10}\frac{P_{i,mW}}{1\ mW} \quad P_{o,dBm} = 10\log_{10}\frac{P_{o,mW}}{1\ mW}$$

such that the expression $P_{i,dBm} - P_{o,dBm}$ is equivalent to $$10\log_{10}\left(\frac{P_{i,mW}}{P_{o,mW}}\right).$$

Optical power loss calculator 620 can provide the calculated optical power loss dB to bend estimator 622.

Bend estimator 622 can be configured to estimate the bend radius r of fiber optic cable 606 based on the optical power loss dB calculated by power loss calculator 620. The amount of power transmitted through fiber optic cable 606 may be proportional to the angle of incidence of the light reflecting off the side walls within fiber optic cable 606. Decreasing the bend radius r (i.e., causing fiber optic cable 606 to bend more) may decrease the angle of incidence of the reflected light, which causes less power to be transmitted through fiber optic cable 606 and increases the optical power loss dB. In other words, as the bend radius r decreases, the optical power loss dB may increase. Conversely, increasing the bend radius r (i.e., causing fiber optic cable 606 to bend less) may increase the angle of incidence of the reflected light, which causes more power to be transmitted through fiber optic cable 606 and decreases the optical power loss dB. In other words, as the bend radius r increases, the optical power loss dB may decrease.

Figure 7:
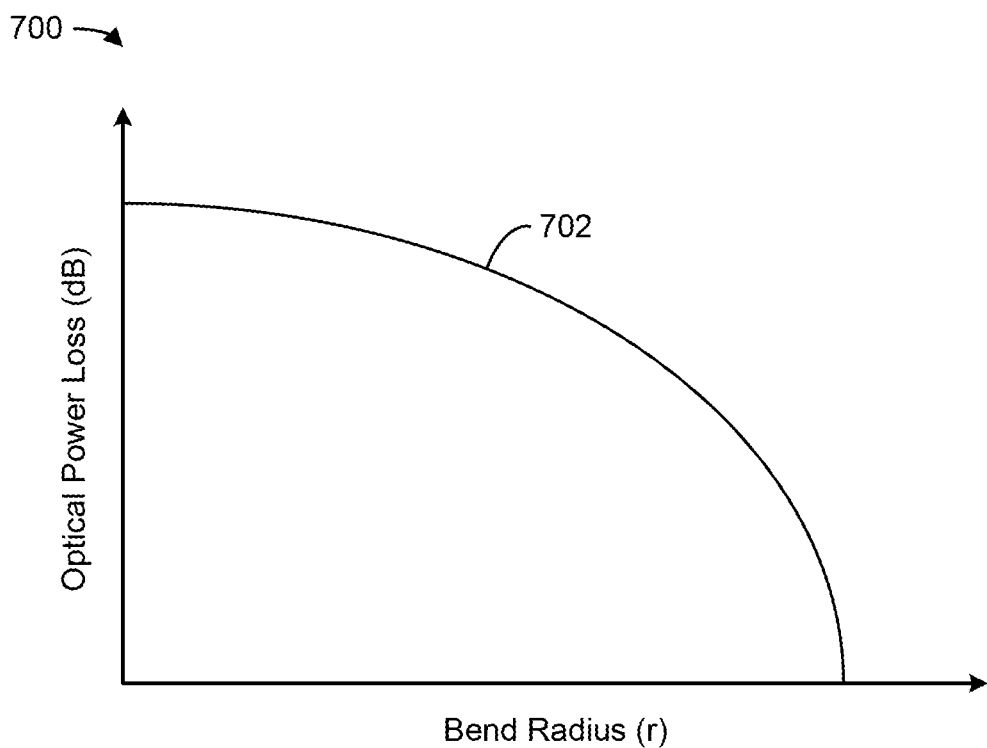
FIG. 7 is a graph illustrating a relationship between optical power loss through a fiber optic cable and a bend radius of the fiber optic cable, according to some embodiments.

In some embodiments, bend estimator 622 uses a power loss model 624 to estimate the bend radius r as a function of optical power loss dB. Power loss model 624 may define a relationship between bend radius r and optical power loss dB. In various embodiments, power loss model 624 may be an equation (e.g., r=f(dB)), a curve, a graph, a lookup table, or other information which can be used to translate an optical power loss dB into a bend radius r. One example of a power loss model 624 which can be used by bend estimator 622 is shown in FIG. 7. FIG. 7 is a graph 700 illustrating the relationship between optical power loss dB and bend radius r. Curve 702 shows that optical power loss dB and bend radius r are inversely related. As the bend radius r increases, the optical power loss dB decreases. Conversely, as the bend radius r decreases, the optical power loss dB increases.

In some embodiments, the relationship between optical power loss dB and bend radius r (i.e., the power loss model 624) is generated from experimental data. For example, the bend radius r of fiber optic cable 606 can be set to known values (e.g., by physically bending fiber optic cable 606) and the corresponding optical power loss dB can be measured at each value of the bend radius r. Each measurement may generate a data point that includes a known bend radius r and a corresponding value of the optical power loss dB (i.e., (r, dB)). Curve 702 can be fit to the data points generated by this experiment (e.g., using a regression technique). The relationship defined by curve 702 can be used by bend estimator 622 as the power loss model 624. In some embodiments, power loss model 624 is preprogrammed into fiber optic flow sensor 602 at the time fiber optic flow sensor 602 is installed. In other embodiments, power loss model 624 can be received via communications interface 612 after fiber optic flow sensor 602 is installed.

Flow estimator 626 can be configured to estimate the flow rate of the fluid through pipe 604 based on the bend radius r determined by bend estimator 622. In some embodiments, the bend radius r of fiber optic cable 606 is inversely related to fluid flow rate. For example, fiber optic cable 606 may be a flexible optical fiber that is substantially linear (i.e., r=∞) when no external forces are applied to fiber optic cable 606. Applying a radial force to fiber optic cable 606 may cause fiber optic cable 606 to bend, thereby decreasing the bend radius r. Increasing the fluid flow rate through pipe 604 may increase the force applied to fiber optic cable 606, which causes fiber optic cable 606 to bend more and decreases the bend radius r. In other words, as the fluid flow rate increases, the bend radius r may decrease. Conversely, decreasing the fluid flow rate through pipe 604 may decrease the force applied to fiber optic cable 606, which causes fiber optic cable 606 to bend less and increases the bend radius r. In other words, as the fluid flow rate decreases, the bend radius r may increase.

Figure 8:
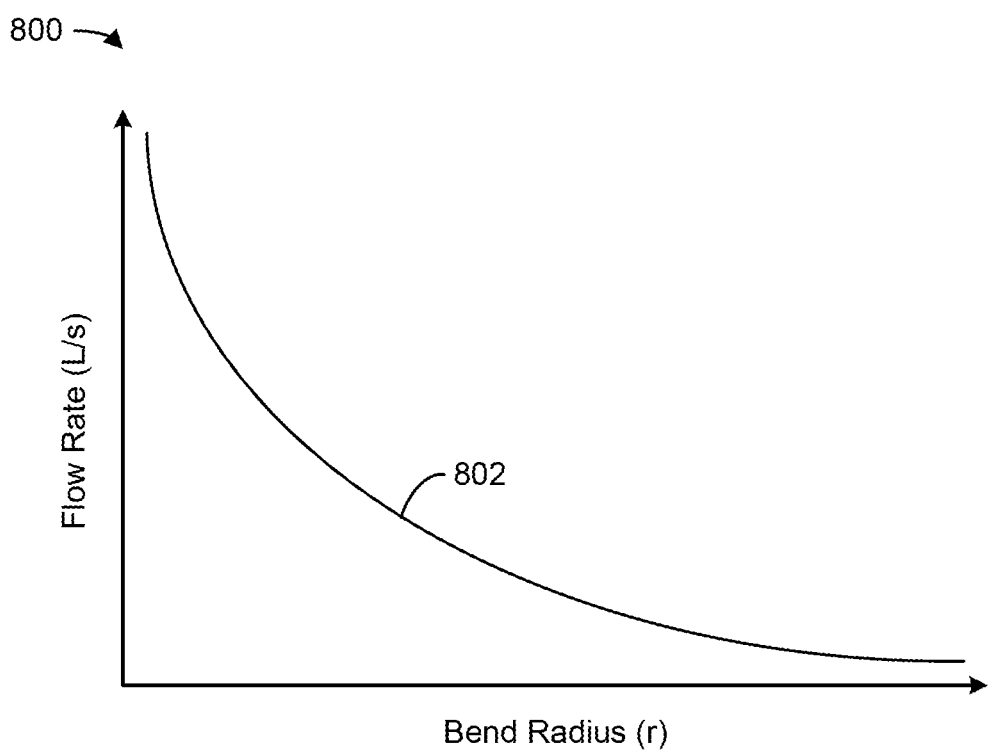
FIG. 8 is a graph illustrating a relationship between fluid flow rate through a pipe and the bend radius of a fiber optic cable inserted into the pipe, according to some embodiments.

In some embodiments, flow estimator 626 uses a flow rate model 628 to estimate the flow rate of the fluid through pipe 604 as a function of the bend radius r. Flow rate model 268 may define a relationship between bend radius r and flow rate. In various embodiments, flow rate model 628 may be an equation (e.g., Flow=f(r)), a curve, a graph, a lookup table, or other information which can be used to translate a bend radius r into a flow rate. In some embodiments, flow rate model 628 is a simply turbulent flow model based on the surface friction of the fluid against the surface area of fiber optic cable 606 within pipe 604. Flow rate model 628 may account for a fluid flow profile 609 that has zero flow on the edge of pipe 604. One example of a flow rate model 628 which can be used by flow estimator 626 is shown in FIG. 8. FIG. 8 is a graph 800 illustrating the relationship between flow rate and bend radius r. Curve 802 shows that flow rate and bend radius r are inversely related. As the flow rate increases, the bend radius r decreases. Conversely, as the flow rate decreases, the bend radius r increases.

In some embodiments, the relationship between flow rate and bend radius r (i.e., the flow rate model 628) is generated from experimental data. For example, the flow rate of the fluid through pipe 604 can be set to known values (e.g., using a separate flow control device) and the corresponding bend radius r can be measured at each value of the flow rate. Each measurement may generate a data point that includes a known flow rate and a corresponding value of the bend radius r (i.e., (Flow, r)). Curve 802 can be fit to the data points generated by this experiment (e.g., using a regression technique). The relationship defined by curve 802 can be used by flow estimator 626 as the flow rate model 628. In some embodiments, flow rate model 628 is preprogrammed into fiber optic flow sensor 602 at the time fiber optic flow sensor 602 is installed. In other embodiments, flow rate model 628 can be received via communications interface 612 after fiber optic flow sensor 602 is installed.

Flow estimator 626 can provide the flow rate to communications interface 612, which can communicate the flow rate to building management system 630, central plant controller 632, smart actuator 634, smart chiller 636, smart thermostat 638, a user device, or other external systems or devices. The equipment that receive the measured flow rate from sensor 602 may include a device controller that uses the measured flow rate to generate actuation signals for various actuation devices (e.g., actuators, valves, fans, dampers, etc.). The device controller can use state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals based on the measured flow rate. For example, if the sensor reading from flow sensor 602 indicates that the flow rate is below a setpoint, the device controller can actuate a valve or pump to increase the flow rate through pipe 604.

Example Implementations

Figure 9:
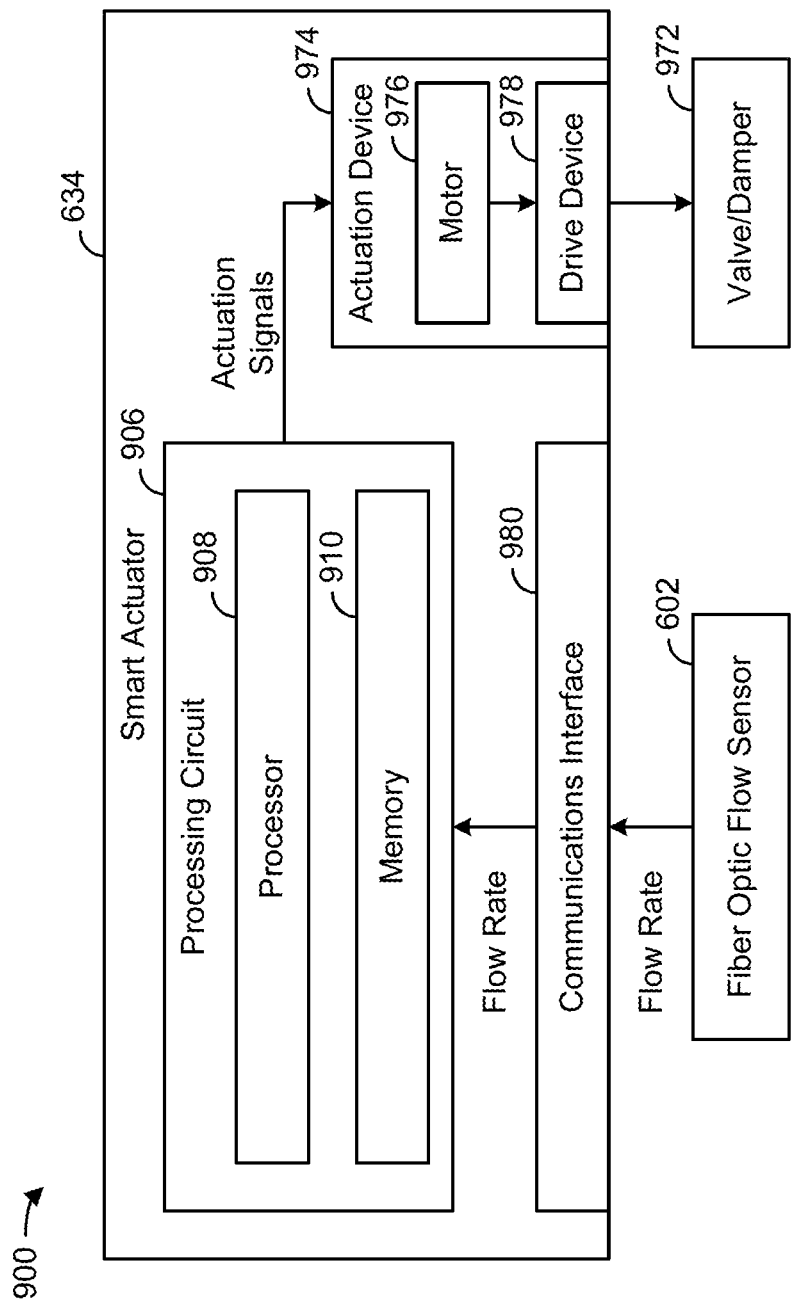
FIG. 9 is a block diagram illustrating an example implementation of the fiber optic flow sensor as part of a smart actuator system, according to some embodiments.
Figure 10:
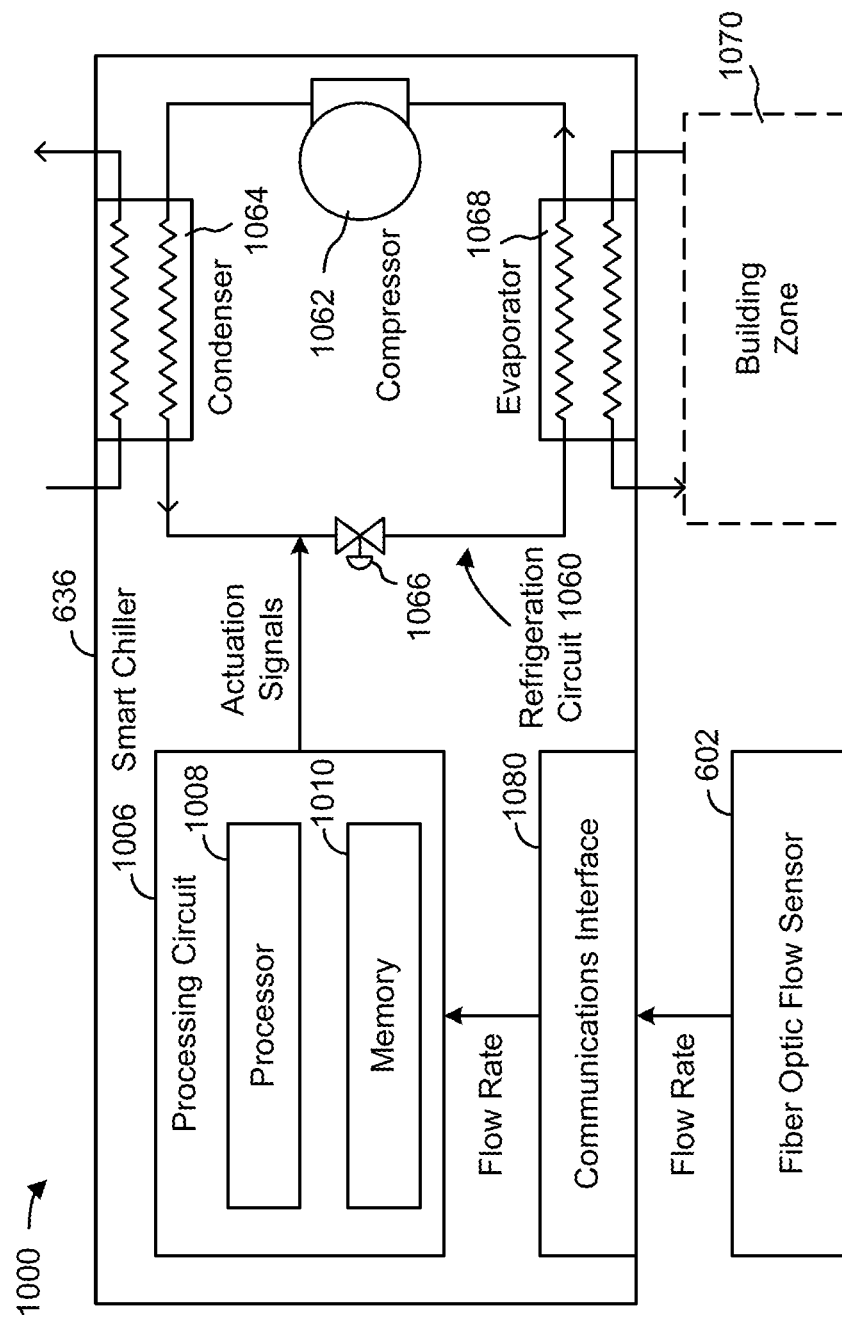
FIG. 10 is a block diagram illustrating an example implementation of the fiber optic flow sensor as part of a smart chiller system, according to some embodiments.
Figure 11:
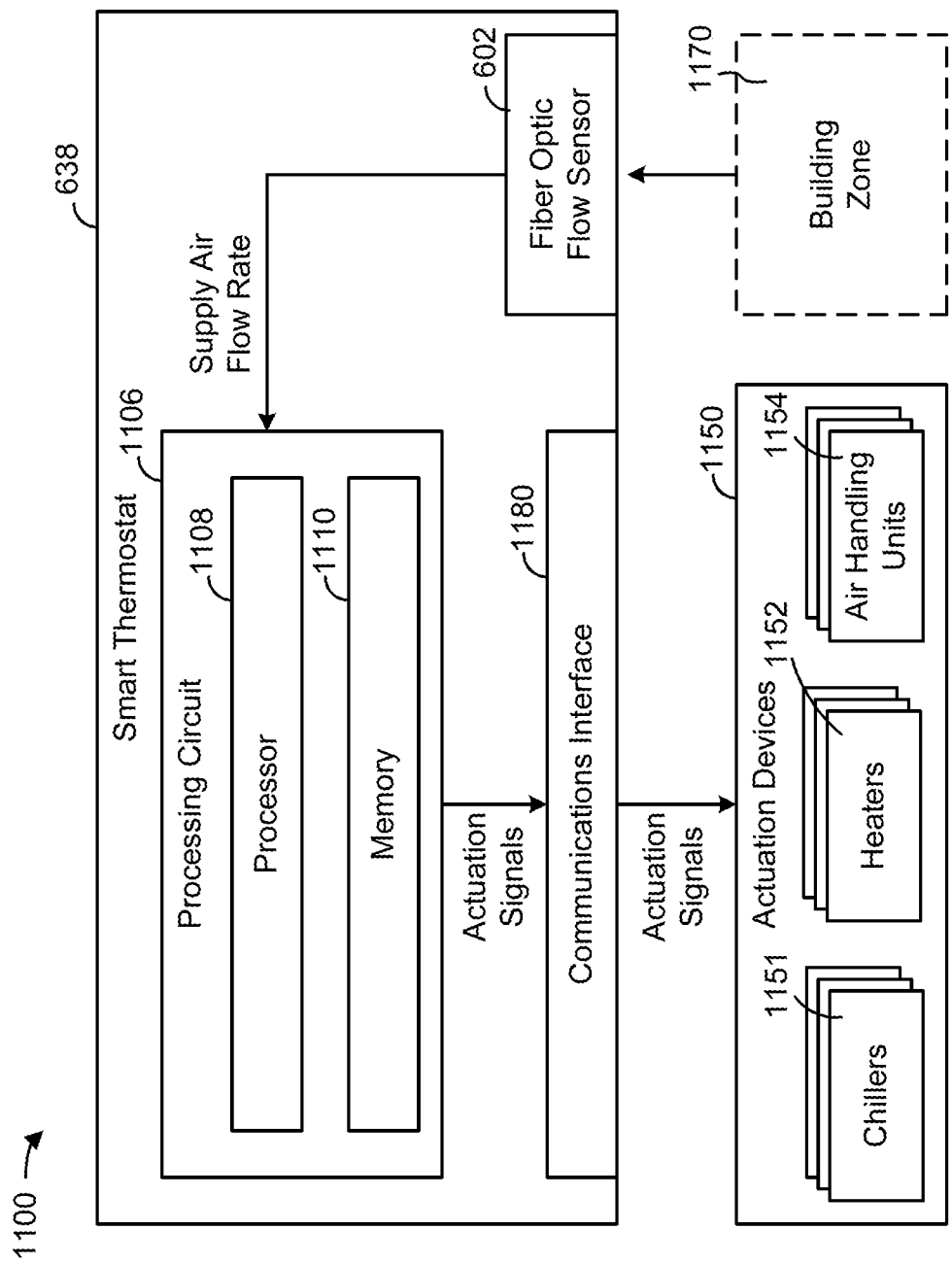
FIG. 11 is a block diagram illustrating an example implementation of the fiber optic flow sensor as part of a smart thermostat system, according to some embodiments.

Referring now to FIGS. 9-11, several example implementations of fiber optic flow sensor 602 are shown, according to some embodiments. FIG. 9 illustrates fiber optic flow sensor 602 as part of a smart actuator system 900. FIG. 10 illustrates fiber optic flow sensor 602 as part of a smart chiller system 1000. FIG. 11 illustrates fiber optic flow sensor 602 as part of a smart thermostat system 1100. Each of these implementations is described in greater detail below.

Smart Actuator System

Referring now to FIG. 9, a block diagram illustrating a smart actuator system 900 is shown, according to some embodiments. System 900 is shown to include a smart actuator 634, fiber optic flow sensor 602, and a valve/damper 972. Smart actuator 634 may be an actuation device which uses the flow rate measurements from fiber optic flow sensor 602 to adjust the flow of fluid through pipe 604. Valve/damper 972 may be an airflow damper, a fluid control valve, an expansion valve, or any other type of flow control device. Smart actuator 634 can be configured to operate valve/damper 972 (e.g., by opening and closing valve/damper 972) based on sensor readings received from fiber optic flow sensor 602.

Although fiber optic flow sensor 602 is shown separate from smart actuator 634 and valve/damper 972, it is contemplated that fiber optic flow sensor 602 can be integrated with smart actuator 634 and/or valve/damper 972 in some embodiments. For example, fiber optic flow sensor 602 may be part of a valve that uses fiber optic flow sensor 602 as an embedded or integrated sensor to measure fluid flow through the valve. Similarly, fiber optic flow sensor 602 can be part of a damper that uses fiber optic flow sensor 602 as an embedded or integrated sensor to measure fluid flow through the damper. In some embodiments, fiber optic flow sensor 602 is part of smart actuator 634 and can be operated by smart actuator 634 to measure the fluid flow rate through a pipe, duct, or other fluid conduit controlled by smart actuator 634. Fiber optic flow sensor 602 can be used as any of the flow sensors described in U.S. patent application Ser. No. 15/399,706 titled "Integrated Smart Actuator and Valve Device" and filed Jan. 5, 2017, the entire disclosure of which is incorporated by reference herein.

Smart actuator 634 is shown to include an actuation device 974 having a motor 976 and a drive device 978. Drive device 978 may be mechanically coupled to valve/damper 972 and configured to open and close valve/damper 972 when operated by motor 976. Motor 976 may be mechanically coupled to drive device 978 and configured to operate drive device 978 based on actuation signals received from processing circuit 906. Unlike conventional actuators, smart actuator 634 can independently and automatically determine appropriate actuation signals for actuation device 974 without requiring input from an external controller.

Smart actuator 634 is shown to include a communications interface 980 and a processing circuit 906. Communications interface 980 may be the same or similar to communications interface 612, as described with reference to FIG. 6. Communications interface 980 can include wired or wireless communications interfaces (e.g., jacks, antennas, transmitters, receivers, transceivers, wire terminals, etc.) for conducting data communications with external systems or devices (e.g., sensor 602, user devices, supervisory controllers, etc.). Data communications via communications interface 980 can be direct (e.g., local wired or wireless communications) or via a communications network (e.g., a LAN, a WAN, the Internet, a cellular network, etc.). For example, communications interface 980 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 906 is shown to include a processor 908 and memory 910. Processing circuit 906 can be communicably connected to communications interface 980 such that processing circuit 906 and the various components thereof can send and receive data via communications interface 980. Processor 908 can be implemented as a general purpose processor, an application specific integrated circuit (ASIC), one or more field programmable gate arrays (FPGAs), a group of processing components, or other suitable electronic processing components.

Memory 910 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 910 can be or include volatile memory or non-volatile memory. Memory 910 can include database components, object code components, script components, or any other type of information structure for supporting the various activities and information structures described in the present application. In some embodiments, memory 910 is communicably connected to processor 908 via processing circuit 906 and includes computer code for executing (e.g., by processing circuit 906 and/or processor 908) one or more processes described herein.

In some embodiments, processing circuit 906 includes a device controller that uses the measured flow rate to generate actuation signals for actuation device 974. The device controller can use state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals based on the measured flow rate. The actuation signals may cause actuation device 974 to open or close valve/damper 972 to drive the measured flow rate to a flow rate setpoint.

Smart Chiller System

Referring now to FIG. 10, a block diagram illustrating a smart chiller system 1000 is shown, according to some embodiments. Smart chiller system 1000 is shown to include a smart chiller 636, fiber optic flow sensor 602, and a building zone 1070. Smart chiller 636 can be configured to provide cooling for building zone 1070 based on flow rate measurements received from fiber optic flow sensor 602. For example, fiber optic flow sensor 602 can be configured to measure the flow rate of a chilled fluid circulated to building zone 1070. If the flow rate of the chilled fluid is above a threshold valve, smart chiller 636 can operate the reduce the temperature of the chilled fluid to increase the amount of cooling provided by smart chiller 636.

Smart chiller 636 is shown to include a refrigeration circuit 1060 having a compressor 1062, a condenser 1064, an expansion device 1066, and an evaporator 1068. Compressor 1062 can be configured to circulate a refrigerant between condenser 1064 and evaporator 1068 based on actuation signals received from processing circuit 1006. Evaporator 1068 can provide cooling for an airflow provided to building zone 1070 either directly (e.g., by directly chilling the airflow) or via an intermediate coolant (e.g., by chilling a coolant which is used to chill the airflow). Unlike conventional chillers, smart chiller 636 can independently and automatically determine appropriate actuation signals for refrigeration circuit 1060 without requiring input from an external controller.

Although fiber optic flow sensor 602 is shown separate from smart chiller 636, it is contemplated that fiber optic flow sensor 602 can be integrated with smart chiller 636 in some embodiments. For example, fiber optic flow sensor 602 can be located within smart chiller 636 and configured to measure the flow rate of refrigerant within refrigeration circuit 1060.

Smart chiller 636 is shown to include a communications interface 1080 and a processing circuit 1006. Communications interface 1080 can include wired or wireless communications interfaces (e.g., jacks, antennas, transmitters, receivers, transceivers, wire terminals, etc.) for conducting data communications with external systems or devices (e.g., sensor 602, user devices, supervisory controllers, etc.). Data communications via communications interface 1080 can be direct (e.g., local wired or wireless communications) or via a communications network (e.g., a LAN, a WAN, the Internet, a cellular network, etc.). For example, communications interface 1080 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 1006 is shown to include a processor 1008 and memory 1010. Processing circuit 1006 can be communicably connected to communications interface 1080 such that processing circuit 1006 and the various components thereof can send and receive data via communications interface 1080. Processor 1008 can be implemented as a general purpose processor, an application specific integrated circuit (ASIC), one or more field programmable gate arrays (FPGAs), a group of processing components, or other suitable electronic processing components.

Memory 1010 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1010 can be or include volatile memory or non-volatile memory. Memory 1010 can include database components, object code components, script components, or any other type of information structure for supporting the various activities and information structures described in the present application. In some embodiments, memory 1010 is communicably connected to processor 1008 via processing circuit 1006 and includes computer code for executing (e.g., by processing circuit 1006 and/or processor 1008) one or more processes described herein.

In some embodiments, processing circuit 1006 includes a device controller that uses the measured flow rate to generate actuation signals for refrigeration circuit 1060. The device controller can use state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals based on the measured flow rate. The actuation signals may cause refrigeration circuit 1060 to increase or decrease the amount of cooling provided to evaporator 1068 based on the measured flow rate.

Smart Thermostat System

Referring now to FIG. 11, a block diagram illustrating a smart thermostat system 1100 is shown, according to some embodiments. Smart thermostat system 1100 is shown to include a smart thermostat 638, actuation devices 1150, and a building zone 1170. Smart thermostat 638 is shown to include fiber optic flow sensor 602. Smart thermostat 638 may also include a temperature sensor, humidity sensor, or any other type of sensor. Fiber optic flow sensor 602 can be configured to measure the flow rate of supply air delivered to building zone 1170 or a flow rate of air through a housing of smart thermostat 638. Smart thermostat 638 can use the measured flow rate to generate actuation signals for actuation devices 1150. Smart thermostat 638 can independently and automatically determine appropriate actuation signals for actuation devices 150 without requiring input from an external controller.

Although fiber optic flow sensor 602 is shown as part of smart thermostat 638, it is contemplated that fiber optic flow sensor 602 can be separate from smart thermostat 638 in some embodiments. For example, fiber optic flow sensor 602 can be located within a supply air duct that delivers air to building zone 1170, an air handling unit, a return air duct, or otherwise positioned to measure flow rate at a particular location within smart thermostat system 1100.

Smart thermostat 638 is shown to include a communications interface 1180 and a processing circuit 1106. Communications interface 1180 may include wired or wireless communications interfaces (e.g., jacks, antennas, transmitters, receivers, transceivers, wire terminals, etc.) for conducting data communications with external systems or devices (e.g., actuation devices 1150, user devices, supervisory controllers, etc.). Data communications via communications interface 1180 can be direct (e.g., local wired or wireless communications) or via a communications network (e.g., a LAN, a WAN, the Internet, a cellular network, etc.). For example, communications interface 1180 can include an Ethernet card and port for sending and receiving data via an Ethernet-based communications link or network, a Wi-Fi transceiver for communicating via a wireless communications network, and/or cellular or mobile phone communications transceivers for communicating via a cellular communications network.

Processing circuit 1106 is shown to include a processor 1108 and memory 1110. Processing circuit 1106 can be communicably connected to communications interface 1180 such that processing circuit 1106 and the various components thereof can send and receive data via communications interface 1180. Processor 1108 can be implemented as a general purpose processor, an application specific integrated circuit (ASIC), one or more field programmable gate arrays (FPGAs), a group of processing components, or other suitable electronic processing components.

Memory 1110 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1110 can be or include volatile memory or non-volatile memory. Memory 1110 can include database components, object code components, script components, or any other type of information structure for supporting the various activities and information structures described in the present application. In some embodiments, memory 1110 is communicably connected to processor 1108 via processing circuit 1106 and includes computer code for executing (e.g., by processing circuit 1106 and/or processor 1108) one or more processes described herein.

In some embodiments, processing circuit 1106 includes a device controller that uses the measured flow rate to generate actuation signals for actuation devices 1150. The device controller can use state-based algorithms, extremum seeking control (ESC) algorithms, proportional-integral (PI) control algorithms, proportional-integral-derivative (PID) control algorithms, model predictive control (MPC) algorithms, or any other type of control methodology to generate the actuation signals based on the measured flow rate. The actuation signals may cause chillers 1151 to increase or decrease an amount of cooling provided to a supply airflow or may cause heaters 1152 to increase or decrease an amount of heating provided to the supply airflow. In some embodiments, the actuation signals cause air handling units 1154 to increase or decrease the flow rate of supply air delivered to building zone 1170.

Fiber Optic Flow Sensing Process

Figure 12:
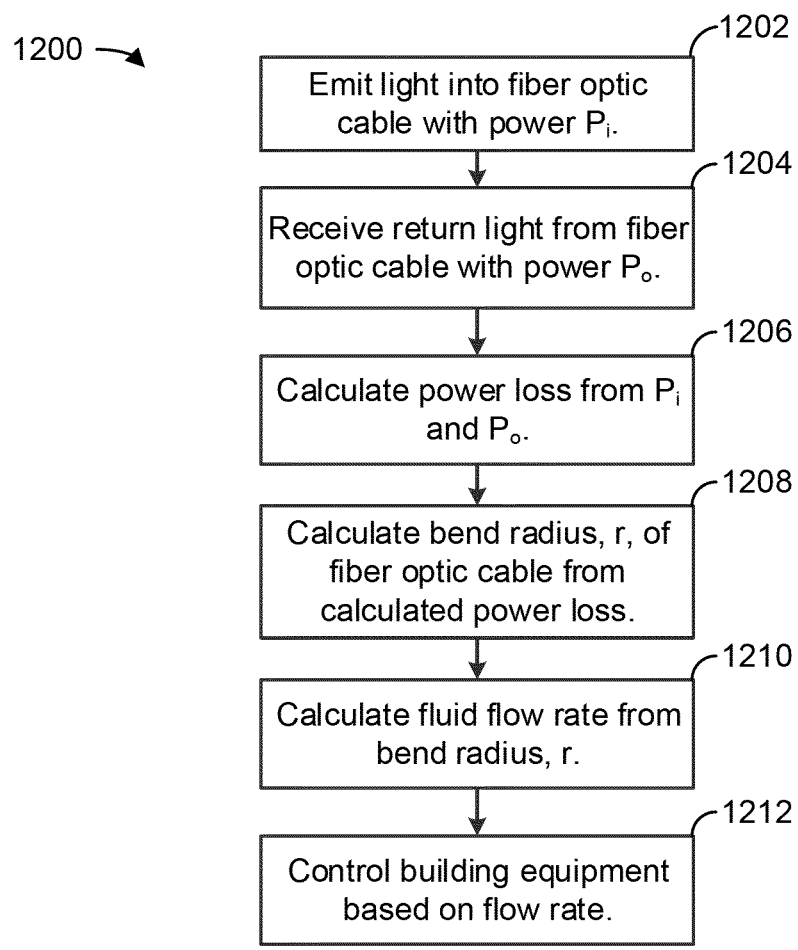
FIG. 12 is a flowchart of a process for determining the flow rate of fluid through a fluid conduit using the fiber optic flow sensor of FIG. 6, according to some embodiments.

Referring now to FIG. 12, a flow diagram of a process 1200 for determining the flow rate of a fluid through a fluid conduit (e.g., a pipe, a duct, etc.) using fiber optic flow sensor 602 is shown, according to some embodiments. In some embodiments, process 1200 is performed by fiber optic flow sensor 602, building management system 630, central plant controller 632, smart actuator 634, smart chiller 636, and/or smart thermostat 638 as previously described. Furthermore, any computing device as described herein can be configured to perform process 1200.

In step 1202, light is emitted into fiber optic cable 606. This step may be performed by fiber optic flow sensor 602, or in some embodiments, by light emitter 608. In some embodiments, the light emitted into fiber optic cable 606 has known input power $P_i$.

In step 1204, light is received from fiber optic cable 606. This step may be performed by fiber optic flow sensor 602, or in some embodiments, by optical power meter 610. In some embodiments, the light received from fiber optic cable 606 has output power $P_o$.

In step 1206, the power loss is calculated from power values $P_i$ and $P_o$. This step may be performed by fiber optic flow sensor 602, or in some embodiments, by power loss calculator 620. Optical power loss may be calculated by a logarithmic based difference. In some embodiments, the optical power loss is a calculated decibel value.

In step 1208, the bend radius is calculated from the optical power loss calculated in step 1206. This step may be performed by fiber optic flow sensor 602, or in some embodiments, by bend estimator 622. Bend radius may be calculated based on power loss model 624 which may be derived from empirical data, or a theoretical relationship regarding the geometry of fiber optic cable 606 and the optical power loss.

In step 1210, the fluid flow rate through pipe 604 is calculated. This step may be performed by fiber optic flow sensor 602, or in some embodiments, by flow estimator 626. Fluid flow rate may be calculated based on flow rate model 628 which may be derived from empirical data, or a theoretical relationship regarding the properties of fiber optic cable 606 as well as fluid properties.

In step 1212, the HVAC component(s) is/are controlled based on the fluid flow rate calculated from step 1210. This step may be performed by fiber optic flow sensor 602, building management system 630, central plant controller 632, smart actuator 634, smart chiller 636, smart thermostat 638, or any other HVAC component with which fiber optic flow sensor 602 is configured to interface.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A fiber optic flow sensor comprising:
   a fiber optic cable configured to allow light to enter a first end of the fiber optic cable, reflect off a second end of the fiber optic cable, and exit the fiber optic cable through the first end, wherein the fiber optic cable is at least partially exposed to a flow of fluid at the second end;
   a light emitter configured to emit light at an input power into the first end of the fiber optic cable;
   an optical power meter configured to measure an output power of the light exiting the fiber optic cable at the first end after the light has reflected off the second end of the fiber optic cable and returned to the first end of the fiber optic cable; and
   a processing circuit configured to calculate a flow rate of the fluid based on the input power of the light entering the fiber optic cable and the output power of the light exiting the first end of the fiber optic cable.

2. The fiber optic flow sensor of claim 1, wherein the processing circuit comprises:
   a power loss calculator;
   a bend estimator; and
   a flow estimator.

3. The fiber optic flow sensor of claim 2, wherein the power loss calculator is configured to calculate a power loss of the light through the fiber optic cable by comparing the input power of the light entering the fiber optic cable to the output power of the light exiting the fiber optic cable at the first end.

4. The fiber optic flow sensor of claim 3, wherein the power loss calculator is configured to calculate the power loss using a logarithmic based difference between the input power and the output power.

5. The fiber optic flow sensor of claim 3, wherein the bend estimator is configured to calculate a bend radius of the fiber optic cable based on the power loss calculated by the power loss calculator.

6. The fiber optic flow sensor of claim 5, wherein the bend estimator is configured to calculate the bend radius using a power loss model that relates the power loss of the light through the fiber optic cable to the bend radius of the fiber optic cable, wherein the power loss model is at least one of:
   an equation;
   a curve;
   a graph;
   a lookup table; or
   an empirical set of data.

7. The fiber optic flow sensor of claim 5, wherein the flow estimator is configured to calculate the flow rate of the fluid based on the bend radius calculated by the bend estimator.

8. The fiber optic flow sensor of claim 5, wherein the flow estimator is configured to calculate the flow rate of the fluid using a flow rate model that relates the bend radius of the fiber optic cable to the flow rate of the fluid, wherein the flow rate model is at least one of:
   an equation;
   a curve;
   a graph;
   a lookup table; or
   an empirical set of data.

9. The fiber optic flow sensor of claim 1, further comprising a communications interface configured to receive the flow rate of the fluid from the processing circuit and to transmit the flow rate to a HVAC component for use in controlling an operation of the HVAC component based on the flow rate of the fluid.

10. The fiber optic flow sensor of claim 9, wherein the HVAC component is at least one of:
    a building management system;
    a central plant controller;
    a smart actuator;
    a smart chiller; or
    a smart thermostat.

11. A method for determining a flow rate of fluid through a fluid conduit, the method comprising:
    inserting a fiber optic cable having a first end and a second end at least partially into the fluid conduit such that the second end of the fiber optic cable is exposed to fluid flow through the conduit;
    emitting light at an input power into the first end of the fiber optic cable, wherein the light enters the first end of the fiber optic cable at the input power, reflects off the second end of the fiber optic cable, and exits the first end of the fiber optic cable at an output power;
    measuring the output power of the light exiting the first end of the fiber optic cable after the light has reflected off the second end of the fiber optic cable and returned to the first end of the fiber optic cable; and
    calculating the flow rate of the fluid through the conduit based on the input power of the light entering the fiber optic cable and the output power of the light exiting the fiber optic cable.

12. The method of claim 11, further comprising:
    calculating a power loss of the light;
    calculating a bend radius of the fiber optic cable; and
    calculating the flow rate of the fluid through the fluid conduit.

13. The method of claim 12, further comprising comparing the input power of the light entering the fiber optic cable to the output power of the light exiting the fiber optic cable at the first end.

14. The method of claim 12, further comprising calculating a logarithmic based difference of the input power of light entering the fiber optic cable and the output power of light exiting the fiber optic cable at the first end.

15. The method of claim 12, further comprising calculating the bend radius of the fiber optic cable based on the power loss of the light.

16. The method of claim 15, further comprising using a power loss model to calculate the bend radius of the fiber optic cable, wherein the power loss model comprises at least one of:
- an equation;
- a curve;
- a graph;
- a lookup table; or
- an empirical set of data; and
- wherein the equation, curve, graph, lookup table, and empirical set of data relate the power loss of the light to the bend radius of the fiber optic cable.

17. The method of claim 12, further comprising calculating the flow rate of the fluid based on the bend radius.

18. The method of claim 17, further comprising using a flow rate model to calculate the flow rate of the fluid, wherein the flow rate model comprises at least one of:
- an equation;
- a curve;
- a graph;
- a lookup table; or
- an empirical set of data; and
- wherein the equation, curve, graph, lookup table, and empirical set of data relate the bend radius of the fiber optic cable to the flow rate of the fluid through the fluid conduit.

19. The method of claim 12, further comprising controlling an HVAC component based on the flow rate of the fluid.

20. The method of claim 19, further comprising controlling at least one of:
- a building management system;
- a central plant controller;
- a smart actuator;
- a smart chiller; or
- a smart thermostat.

* * * * *